(12) United States Patent
Roth

(10) Patent No.: US 12,154,465 B2
(45) Date of Patent: Nov. 26, 2024

(54) HEAD-UP DISPLAY

(71) Applicant: ENVISICS LTD, Milton Keynes (GB)

(72) Inventor: Fabien Roth, Milton Keynes (GB)

(73) Assignee: Envisics Ltd, Milton Keynes (GB)

( * ) Notice: Subject to any disclaimer, the term of this patent is extended or adjusted under 35 U.S.C. 154(b) by 0 days.

(21) Appl. No.: 18/072,186

(22) Filed: Nov. 30, 2022

(65) Prior Publication Data

US 2023/0267861 A1    Aug. 24, 2023

(30) Foreign Application Priority Data

Feb. 22, 2022 (GB) ..................................... 2202423

(51) Int. Cl.
*G09G 3/00* (2006.01)
*G02B 27/01* (2006.01)

(52) U.S. Cl.
CPC .......... *G09G 3/001* (2013.01); *G02B 27/0101* (2013.01); *G02B 2027/014* (2013.01);
(Continued)

(58) Field of Classification Search
CPC .............. G09G 3/001; G09G 2340/04; G09G 2340/12; G09G 2354/00; G09G 2380/10; G02B 27/0101; G02B 2027/014; G02B 2027/0183; G02B 2027/0138; G02B 2027/0141; G02B 27/0103; G02B 27/0172; G02B 27/0012; G02B 27/0037; G02B 2027/0105; G02B 2027/0109; G02B 2027/0178; G02B 2027/015; B60K 2370/1529; B60K 2370/177; B60K 2370/178; B60K 2370/179; B60K 35/00; B60K 2360/177; B60K 2360/178; B60K 2360/179; B60K 2360/23;
(Continued)

(56) References Cited

U.S. PATENT DOCUMENTS

2011/0157667 A1   6/2011   Lacoste et al.
2015/0009695 A1*  1/2015   Christmas ............. F21S 41/645
                                                      362/466
(Continued)

FOREIGN PATENT DOCUMENTS

GB    2603517 A    8/2022
KR    2021-0135772 A    11/2021
(Continued)

*Primary Examiner* — Brent D Castiaux
(74) *Attorney, Agent, or Firm* — McDonnell Boehnen Hulbert & Berghoff LLP

(57) ABSTRACT

A head-up display for a vehicle. The head-up display comprises a projector and processor. The projector is arranged to project image content such that it is visible from an eye-box. The processor is arranged to receive captured images of a scene visible from the eye-box. The processor is arranged, at a first time to: detect a first object in a scene and instruct the image projector to project an icon (e.g. computer graphic) that appears, from the viewing position, to be coincident with the first object. The processor is further arranged to, at a second time later than the first time to: detect a second object in a line of sight from the eye-box position to the first object and instruct the image projector to change the visual appearance of the projected icon in response to the detection of the second object.

20 Claims, 8 Drawing Sheets

(52) U.S. Cl.
CPC ..... *G09G 2340/04* (2013.01); *G09G 2354/00* (2013.01); *G09G 2380/10* (2013.01)

(58) Field of Classification Search
CPC ........ B60K 2360/334; B60K 2360/785; B60K 35/23; B60K 35/28; B60K 35/60; G06F 1/1639; G06F 3/04815; G06F 3/013; G06F 3/04817; G06V 20/20; G06V 20/56; G03H 1/2294; G03H 2001/2213; G03H 2001/2284; G03H 2210/36; G03H 2226/05; G03H 2226/11; G03H 1/02; G03H 1/2205; G03H 1/2249; G03H 2001/0224; G03H 2001/2218; G03H 2001/2236; G03H 2222/12; G03H 2223/14; G03H 2223/24; G06T 19/006
See application file for complete search history.

(56) References Cited

U.S. PATENT DOCUMENTS

| | | | |
|---|---|---|---|
| 2018/0059779 A1* | 3/2018 | Sisbot | G06T 19/20 |
| 2020/0307617 A1* | 10/2020 | Sakai | B60W 50/14 |
| 2021/0155159 A1* | 5/2021 | Kawate | B60K 35/00 |
| 2021/0191132 A1 | 6/2021 | Mate | |

FOREIGN PATENT DOCUMENTS

| | | |
|---|---|---|
| WO | 2020/016214 A1 | 1/2020 |
| WO | 2020043598 A1 | 3/2020 |

\* cited by examiner

HEAD-UP DISPLAY

CROSS REFERENCE TO RELATED APPLICATIONS

The present application is claims priority to United Kingdom Patent Application No. GB2202423.6 filed Feb. 22, 2022, which is herewith incorporated by reference into the present application.

FIELD

The present disclosure relates to a projector and a head-up display. More specifically, the present disclosure relates to a holographic projector and a head-up display for a vehicle such as an automotive vehicle. The present disclosure also relates to a method of holographic projection, a method of projecting a virtual image in a head-up display and a method of displaying a virtual image on a window such as a windscreen using a head-up display.

BACKGROUND

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram, "CGH", may be calculated by a technique based on a mathematical transformation such as a Fresnel or Fourier transform. These types of holograms may be referred to as Fresnel or Fourier holograms. A Fourier hologram may be considered a Fourier domain representation of the object or a frequency domain representation of the object. A CGH may also be calculated by coherent ray tracing or a point cloud technique, for example.

A CGH may be encoded on a spatial light modulator, "SLM", arranged to modulate the amplitude and/or phase of incident light. Light modulation may be achieved using electrically-addressable liquid crystals, optically-addressable liquid crystals or micro-mirrors, for example.

The SLM may comprise a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The SLM may be reflective meaning that modulated light is output from the SLM in reflection. The SLM may equally be transmissive meaning that modulated light is output from the SLM is transmission.

A holographic projector for imaging may be provided using the described technology. Such projectors have found application in head-up displays, "HUD", and head-mounted displays, "HMD", including near-eye devices, for example. Conventionally, a rectangular area (referred to herein as a virtual image area) is defined in the driver's field of view and the head-up display may display image content in this rectangular area.

SUMMARY

Aspects of the present disclosure are defined in the appended independent claims.

Broadly, the present disclosure relates to image projection. It relates to a method of image projection and an image projector which comprises a display device. The present disclosure also relates to a projection system comprising the image projector and a viewing system, in which the image projector projects or relays light from the display device to the viewing system. The present disclosure is equally applicable to a monocular and binocular viewing system. The viewing system may comprise a viewer's eye or eyes. The viewing system comprises an optical element having optical power (e.g., lens/es of the human eye) and a viewing plane (e.g., retina of the human eye/s). The projector may be referred to as a 'light engine'. The display device and the image formed (or perceived) using the display device are spatially separated from one another. The image is formed, or perceived by a viewer, on a display plane. In some embodiments, the image is a virtual image and the display plane may be referred to as a virtual image plane. In other embodiments, the image is a real image formed by holographic reconstruction and the image is projected or relayed to the viewing plane. The image is formed by illuminating a diffractive pattern (e.g., hologram) displayed on the display device.

The display device comprises pixels. The pixels of the display may display a diffractive pattern or structure that diffracts light. The diffracted light may form an image at a plane spatially separated from the display device. In accordance with well-understood optics, the magnitude of the maximum diffraction angle is determined by the size of the pixels and other factors such as the wavelength of the light.

There is also disclosed herein an improved HUD for an automotive vehicle. The HUD includes a picture generating unit. The picture generating unit may be arranged to generate a picture including information content, such as speed or navigation information. There is also provided an optical system arranged to form a virtual image of the information content. The virtual image of the information content may be formed at a suitable viewing position for the driver such as within the driver's normal field of view whilst operating the automotive vehicle. For example, the virtual image of the information content may appear at a distance down the bonnet (or hood) of the vehicle from the driver. The virtual image of the information content is positioned so as not to adversely affect the driver's normal view of the scene. The virtual image of the information content may be overlaid on the driver's view of the real world. The information content is computer-generated and may be controlled or updated in real-time to provide real-time information to the driver.

Embodiments relate to a picture generating unit comprises a holographic projector by way of example only. The present disclosure is compatible with any display technology including a backlit liquid crystal display, a laser scanning display, a digital micro-mirror device "DMD", a fluorescent display and a plasma display. In embodiments relating to a holographic projector, the picture is a holographic reconstruction of a computer-generated hologram. A HUD based on the holographic projector described in full below is able to deliver a much greater contrast ratio than currently available competing technologies because of the efficiency of the holographic process and its inherent suitability for use with a laser light source.

The head-up display may comprise a holographic processor. The picture may be a holographic reconstruction. The holographic processor may be arranged to output the computer-generated hologram to a spatial light modulator. The computer-generated hologram may be arranged to, at least partially, compensate for the shape of the windscreen of the vehicle.

The system may be arranged to form the virtual image of the picture using the windscreen by reflecting spatially-modulated light off the windscreen. The light source may be a laser and/or the light of the picture may be laser light. The spatial light modulator may be a liquid crystal on silicon spatial light modulator. The picture may be formed by an interference process of the spatially-modulated light at the light receiving surface. Each computer-generated hologram may be a mathematical transformation of a picture, optionally, a Fourier or Fresnel transformation. The computer-generated hologram may be a Fourier or Fresnel hologram. The computer-generated hologram may be a hologram computer-generated by a point cloud method. The spatial light modulator may be arranged to spatially-modulate the phase of the light from the light source. The spatial light modulator may be arranged to spatially-modulate the amplitude of the light from the light source.

There is provided a head-up display for a vehicle having a window. The head-up display comprises a display device and an optical system. In some embodiments, the display device is arranged to display a hologram of an image or picture for projection. The image or picture may be said to comprise image or picture content. The image or picture content may comprise a plurality of discrete computer graphics.

In a first group of embodiments, a holographic reconstruction of the image is formed on a screen such as a diffuser by illuminating the display device with light from a light source such as a laser diode. In these embodiments, the laser diode, display device and screen form a picture generating unit that will be familiar to the person skilled in the art of holographic projection. In these embodiments, the optical system may comprise an optical relay system, having at least one element with optical power, arranged to magnify the picture on the screen and project it towards a windscreen of the vehicle to form a enlarged virtual image of the picture. Such as a configuration has been disclosed in WO2020/016214, for example, which is incorporated herein in full by reference.

In a second group of embodiments, an intermediate reconstruction of the picture is not formed on a screen and, instead, the hologram (more specifically, light encoded with the hologram or spatially modulated in accordance with the displayed hologram) is projected directly to the viewer. In these embodiments, it is sometimes said that the lens of the viewer's eye performs the hologram-to-image transformation—which may be a Fourier or Fresnel transformation, for example. In these embodiments, a pupil expander (or pair of orthogonal pupil expanders) may be employed to expand the eye-box. Such a configuration has been disclosed in GB2101666.2 filed 5 Feb. 2021, for example, which is incorporated herein in full by reference.

According to a first aspect of the present disclosure, there is a head-up display for a vehicle. The head-up display comprises a projector and processor. The projector is arranged to project image content (such that it is) visible from an eye-box. The processor is arranged to receive captured images of a scene visible from the eye-box. The processor is arranged, at a first time to: detect a first object in a scene and instruct/drive the image projector to project an icon (e.g. computer graphic) that appears, from a viewing position (within the eye-box—i.e. an eye-box position), to be aligned/coincident with the first object. The processor is further arranged to, at a second time later than the first time to: detect a second object in a line of sight from the viewing position to the first object and instruct/drive the image projector to change the visual appearance of the projected icon in response to the detection of the second object.

The step of changing the visual appearance of the projected icon may comprise changing at least one aspect of the physical form of the projected icon.

The at least one physical form of the projected icon may be selected from the group comprising: shape, colour, size and luminance.

The image projector may be a holographic projector comprising a spatial light modulator arranged to display a hologram of the projected image content. The holograms may be calculated in real-time.

The image content may be projected using an optical combiner such that the image content complements/adds to/overlays the scene visible from the eye-box.

The processor may be arranged to continually receive a viewing position (e.g. eye-box position) of a viewer within the eye-box and determine if the second object is in the line of sight based on a received viewing position (e.g. eye-box position).

The first object may be a moving object. The processor may be arranged to determine whether the second object is in the line of sight to the first object based on the position of the first object at the second time and, optionally, the viewing position (e.g. eye-box position) of the viewer at the second time.

The processor may be arranged to maintain positional/visual alignment between the projected icon and first object, optionally, based on the received viewing position (e.g. eye-box position).

According to a second aspect of the present disclosure, there is a driver assistance system comprising a head-up display, a camera and a user-tracking system. The camera is arranged to capture images of a scene and continually output the captured images to the head-up display. The user-tracking system is arranged to monitor the position of the user of the head-up display and continually output the eye-box position of the user to the head-up display.

According to a third aspect of the present disclosure, there is a method of head-up display. The method comprises a first step of capturing a first image of a scene at a first time. The method comprises a second step of detecting a first object in the first image of the scene. The method comprises a third step of projecting an icon that appears, from an eye-box position, to be aligned/coincident with the first object. The method comprises a fourth step of capturing a second image of the scene at a second time. The method comprises a fifth step of detecting a second object in a line of sight from the user (e.g. eye-box position) to the first object. The method comprises a sixth step of changing the visual appearance of the projected icon in response to the detection of the second object.

The method may further comprise changing the visual appearance of the projected icon comprises changing at least one aspect of the physical form of the projected icon. The at least one physical form of the projected icon may be selected from the group comprising: shape, colour, size and luminance.

The term "hologram" is used to refer to the recording which contains amplitude information or phase information, or some combination thereof, about the object. The term "holographic reconstruction" is used to refer to the optical reconstruction of the object which is formed by illuminating the hologram. The term "replay plane" is used herein to refer to the plane in space where the holographic reconstruction is fully formed. The term "replay field" is used herein to refer to the sub-area of the replay plane which can receive spatially-modulated light from the spatial light modulator. The terms "image", "replay image" and "image region" refer to areas of the replay field illuminated by light forming the holographic reconstruction. In embodiments, the "image" may comprise discrete spots which may be referred to as "image pixels".

The terms "encoding", "writing" or "addressing" are used to describe the process of providing the plurality of pixels of the SLM with a respect plurality of control values which respectively determine the modulation level of each pixel. It may be said that the pixels of the SLM are configured to "display" a light modulation distribution in response to receiving the plurality of control values. Thus, the SLM may be said to "display" a hologram.

It has been found that a holographic reconstruction of acceptable quality can be formed from a "hologram" containing only phase information related to the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will change the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

Although reference is made to a head-up display for a vehicle, the skilled person will understand that the present disclosure extends to head-up display for other purposes and the device may more generally be referred to as a display system.

In the present disclosure, the term "substantially" when applied to a structural units of an apparatus may be interpreted as the technical feature of the structural units being produced within the technical tolerance of the method used to manufacture it.

BRIEF DESCRIPTION OF THE FIGURES

Specific embodiments are described by way of example only with reference to the following figures:
Specific embodiments are described by way of example only with reference to the following figures.

The same reference numbers will be used throughout the drawings to refer to the same or like parts.

DETAILED DESCRIPTION

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

Optical Configuration

Figure 1:
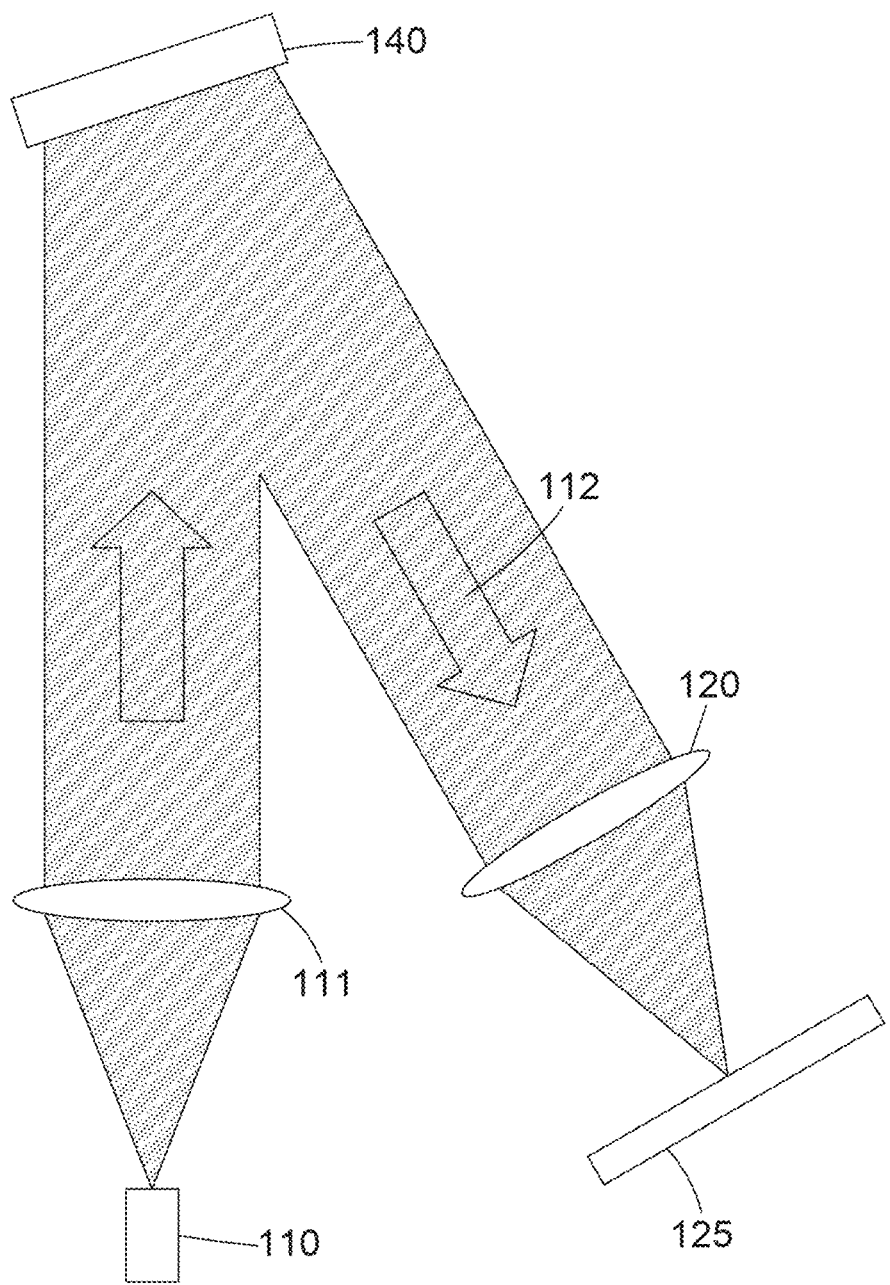
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms. Embodiments relate to Fourier holography and Gerchberg-Saxton type algorithms by way of example only. The present disclosure is equally applicable to Fresnel holography and Fresnel holograms which may be calculated by a similar method. In some embodiments, the hologram is a phase or phase-only hologram. However, the present disclosure is also applicable to holograms calculated by other techniques such as those based on point cloud methods. United Kingdom application No. GB 2112213.0 filed 26 Aug. 2021, incorporated herein by reference, discloses example hologram calculation methods that may be combined with the present disclosure.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Light Modulation

The display system comprises a display device defining the exit pupil of the display system. The display device is a spatial light modulator. The spatial light modulation may be a phase modulator. The display device may be a liquid crystal on silicon, "LCOS", spatial light modulator.

AR-HUD

Augmented Reality, "AR", systems may be utilized in a multiplicity of instances. One exemplary use for AR is to aid users while operating a vehicle. For instance, virtual content may be presented on a HUD to provide a user with directions to a desired destination. Virtual arrows or other indicators may be presented on the HUD to augment the user's physical world and provide a route the user should follow to reach their desired destination. As another example, informational text may be presented on the HUD that describes nearby stores, vehicles, etc. While it is contemplated that AR provides valuable information, presenting information on a HUD presents challenges due to the continuously changing environment. The distances between the vehicle and surrounding objects change as the vehicle and/or the surrounding objects move.

AR allows a user to augment reality with virtual content. Virtual content may be presented on a transparent display of a viewing device to augment the user's real-world environment. As an example, virtual content presented on a HUD in an automobile can present the user with arrows, shapes, 3D objects, other indicators, and or other illustrations that may provide the user with directions to a desired destination, and/or other information with respect to the environment. As another example, virtual content describing vehicles and/or businesses can be presented on the HUD to provide a user with additional information regarding their environment.

To augment the reality of a user, virtual content may be presented on the HUD to create the appearance that the virtual content is present in the user's real-world environment rather than just presented arbitrarily on a display. To properly create this appearance, a viewing device adjusts a rendering of the virtual content corresponding to a physical object.

A display system is used to augment the reality of a user. The user may be a human user (e.g., a human being), a machine user (e.g., a computer configured by a software program to interact with the viewing device), or any suitable combination thereof (e.g., a human assisted by a machine or a machine supervised by a human). The display system is a computing device integrated in a vehicle, such as an automobile, to provide virtual content on a head-up display (HUD).

The display system may comprise a transparent or semi-transparent screen which may be the windshield of a car housing the display system or an optical combiner, such as pop-up combiner, of a stand-alone head-up display. The user may simultaneously view virtual content presented by the display system as well as a physical objects in the user's field of view of the real-world physical environment.

The display system may provide the user with an augmented reality experience. For example, the display system can present virtual content that the user can view in addition to physical objects that are in the field of view of the user in the real-world physical environment. Virtual content can be any type of image, animation, etc., presented on the display. For example, virtual content can include a virtual model (e.g., 3D model) of an object or a simple indicia such as a warning triangle and similar shape.

The physical object may include any type of identifiable objects such as a 2D physical object (e.g., a picture), a 3D physical object (e.g., a vehicle, cyclist, pedestrian, building, street, etc.), a location (e.g., at the bottom floor of a factory), or any references (e.g., perceived corners of walls or furniture) in the real-world physical environment.

The display system can present virtual content in response to detecting one or more identified objects (e.g., physical object) in the physical environment. For example, the display system may include optical sensors to capture images of the real-world physical environment and computer vision recognition to identify physical objects.

In one example embodiment, the display system locally analyses captured images using a local content dataset or any other dataset previously stored by the display system. The local content dataset may include a library of virtual content associated with real-world physical objects or references. For example, the local content dataset can include image data depicting real-world physical objects. The display system can utilize the captured image of a physical object to search the local content dataset to identify the physical object and its corresponding virtual content.

In one example, the display system can analyse an image of a physical object to identify feature points of the physical object. The display system can utilize the identified feature points to identify a corresponding real-world physical object from the local content dataset. The display system may also identify tracking data related to the physical object (e.g., GPS location of the viewing device, orientation, distance to the physical object).

If the captured image is not recognized locally, the display system can download additional information (e.g., virtual content) corresponding to the captured image, from a database of a server over a network, for example.

In another example, a physical object in the image is tracked and recognized remotely at the server using a remote dataset or any other previously stored dataset of the server. The remote content dataset may include a library of virtual content or augmented information associated with real-world physical objects or references. In this type of embodiment, the display system can provide the server with the captured image of the physical object. The server can use the received image to identify the physical object and its corresponding virtual content. The server can then return the virtual content to the viewing device.

The display system can project the virtual content to augment the reality of the user. For example, the display system can present the virtual content to allow the user to simultaneously view the virtual content as well as the real-world physical environment in the field of view.

As an example, the display system can change a visual property of the virtual content (e.g. shape) corresponding to a cyclist as another vehicle crosses the user's field of view or line of sight to the cyclist. As another example, the display system can change the colour or size of virtual content in response to the same scenario.

The display system can present the virtual content at a position that corresponds to the location of the physical object as perceived by a user. Accordingly, the virtual content appears to the user to be nearby or overlapping the physical object.

The display system continuously updates the presentation of the virtual content based on the location of the physical object in relation to the user by re-rendering the virtual content based on changes of the location. As a result, the user may perceive the virtual content to be fixed in a location of the user's real-world environment as the user moves.

Any of the machines, databases, or devices disclosed herein may be implemented in a general-purpose computer modified (e.g., configured or programmed) by software to be a special-purpose computer to perform one or more of the functions described herein for that machine, database, or device. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices may be combined into a single machine, and the functions described herein for any single machine, database, or device may be subdivided among multiple machines, databases, or devices.

The network may be any network that enables communication between or among machines (e.g., server), databases, and devices (e.g., head-up displays). Accordingly, the network may be a wired network, a wireless network (e.g., a mobile or cellular network), or any suitable combination thereof. The network may include one or more portions that constitute a private network, a public network (e.g., the Internet), or any suitable combination thereof.

Figure 2:
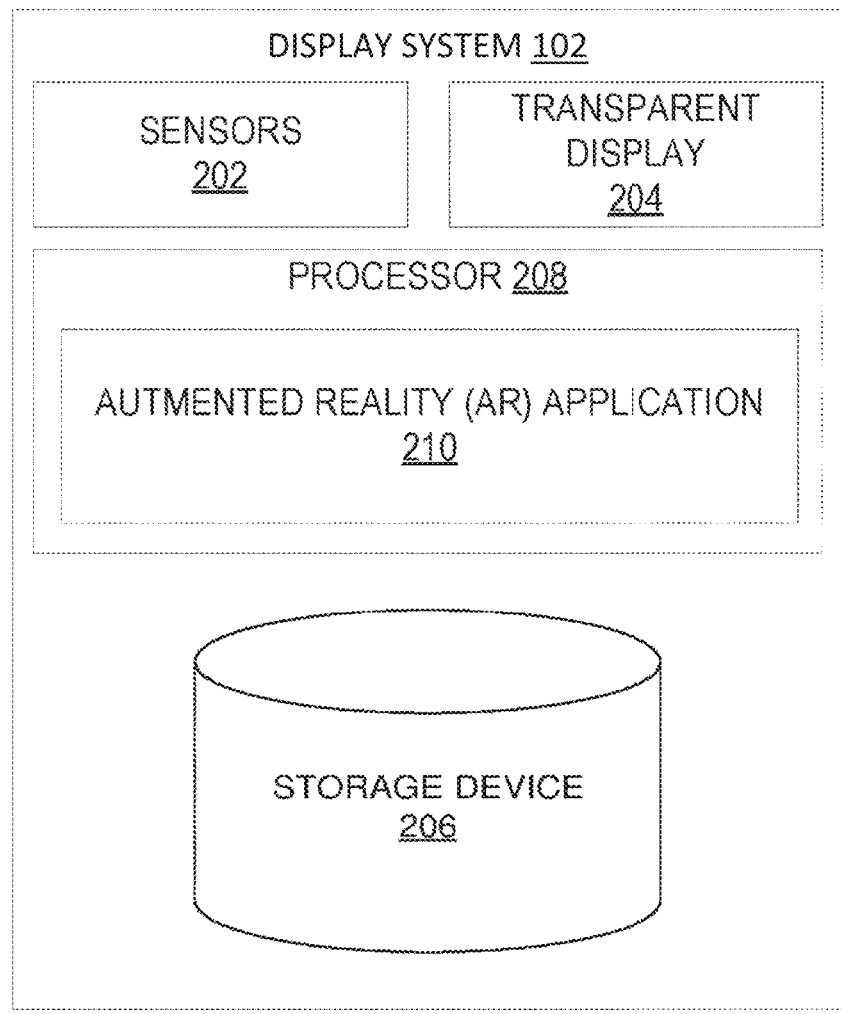
FIG. 2 illustrates a block diagram of a display system in accordance with some embodiments.

FIG. 2 illustrates a block diagram in accordance with embodiments. The display system 102 includes sensors 202, a transparent display 204, a computer processor 208, and a storage device 206. The display system 102 is integrated into a vehicle, such as an automobile, motorcycle, plane, boat, recreational vehicle (RV), etc.

The sensors 202 can include any type of known sensors. The sensors 202 include at least one infrared or visible light image capture device (e.g. camera) arranged to capture images of the scene at, for example, video rate.

The transparent display 204 includes, for example, a display configured to display holograms of virtual images generated and calculated by the processor 208. The transparent display 204 can be positioned such that the user can simultaneously view virtual content presented on the transparent display and a physical object in a field of view of the user. For example, the transparent display 204 can be a HUD in an automobile or other vehicle that presents virtual content on a windshield of the vehicle while also allowing a user to view physical objects through the windshield. For example, the HUD can be configured to display virtual images itself or, alternatively, can presented virtual images projected onto the HUD.

The processor 208 includes an AR application 210 configured to present virtual content on the transparent display 204 to augment the reality of the user. The AR application 210 can receive data from sensors 202 (e.g., an image of the physical object, location data, etc.), and use the received data to identify at least one physical object (e.g. cyclist) and project virtual content (e.g. a warning shape) using the transparent display 204.

To identify the physical object (e.g. cyclist), the AR application 210 determines whether an image captured by the display system 102 matches an image locally stored by the display system 102 in the storage device 206. The storage device 206 can include a local content dataset of images and corresponding virtual content. For example, the display system 102 can receive a content data set from the server 110, and store the received content data set in the storage device 206.

The AR application 210 can compare a captured image of the physical object to the images locally stored in the storage device 206 to identify the physical object. For example, the AR application 210 can analyse the captured image of a physical object to identify feature points of the physical object. The AR application 210 can utilize the identified feature points to identify the physical object from the local content dataset. In some embodiments, the AR application 210 can identify a physical object based on characterising features of the object.

If the AR application 210 cannot identify a matching image from the local content dataset, the AR application 210 may provide the captured image of the physical object to the server 110. The server 110 uses the captured image to search a remote content dataset maintained by the server 110.

The remote content dataset maintained by the server can be larger than the local content dataset maintained by the display system 102. For example, the local content dataset maintained by the display system 102 can include a subset of the data included in the remote content dataset, such as a core set of images or the most popular images determined by the server.

Once the physical object (e.g. cyclist) has been identified by either the display system 102 or the server, the corresponding virtual content can be retrieved and projected on the transparent display 204 to augment the reality of the user by displaying the virtual content so that the virtual content is overlain on the real-world view of the user through the transparent display. The AR application 210 can present the virtual content on the transparent display 204 to, for example, highlight the physical object (e.g. cyclist) to the user—i.e. draw the user's attention to the cyclist. For example, the AR application 210 can present a shape or other indicator that are overlain with the physical object (e.g. cyclist).

Virtual Content Change in Response to a Hidden Object

As described in the following, the AR application 210 adjusts one or more properties or parameters of the virtual content based on detection of another object between the physical object (e.g. cyclist) and the viewer. Adjusting the properties or parameters results in the virtual content being displayed with a different property (e.g. shape or colour) when an intervening object is detected. That is, the virtual content has a changed or modified appearance.

In an embodiment, the AR application 210 changes the shape of the virtual content corresponding to a cyclist as a car blocks the user's view of the cyclist—e.g. blocks the field of view such as crosses the line of sight. Accordingly, the physical form of the virtual content presented on the transparent display 204 becomes different when the car interferes with the users 106 view of the cyclist. As another example, the AR application 210 can change a colour of virtual content corresponding to the cyclist as the car moves into the line of sight. The virtual content may have a first form when the user has an unimpeded view of the physical object (e.g. cyclist) and the virtual content may have a second form when the user's view of the physical object (e.g. cyclist) is impeded.

The AR application 210 may continuously updates presentation of the virtual content based on the location of the physical object (e.g. cyclist) in relation to the other vehicle and/or the user. As the other vehicle and physical object move with respect to each other, new data may be used by the AR application 210 to re-render the virtual content on the transparent display 204, at display positions that correspond to the new location data.

The AR application 210 may update presentation of the virtual content as the vehicle and/or physical object change positions. For example, the AR application 210 can gather updated sensor data from the sensors 202 as the vehicle moves and determine an updated position of the physical object in relation to the vehicle. The AR application 210 updates presentation of the virtual content based on the determined updated position of the physical object in relation to the vehicle. For example, the AR application 210 adjusts a display shape of the virtual content based on the updated position of the physical object. The AR application 210 presents the updated presentation of the virtual content on the transparent display 204, thereby providing the user with a changed depiction of the virtual content.

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
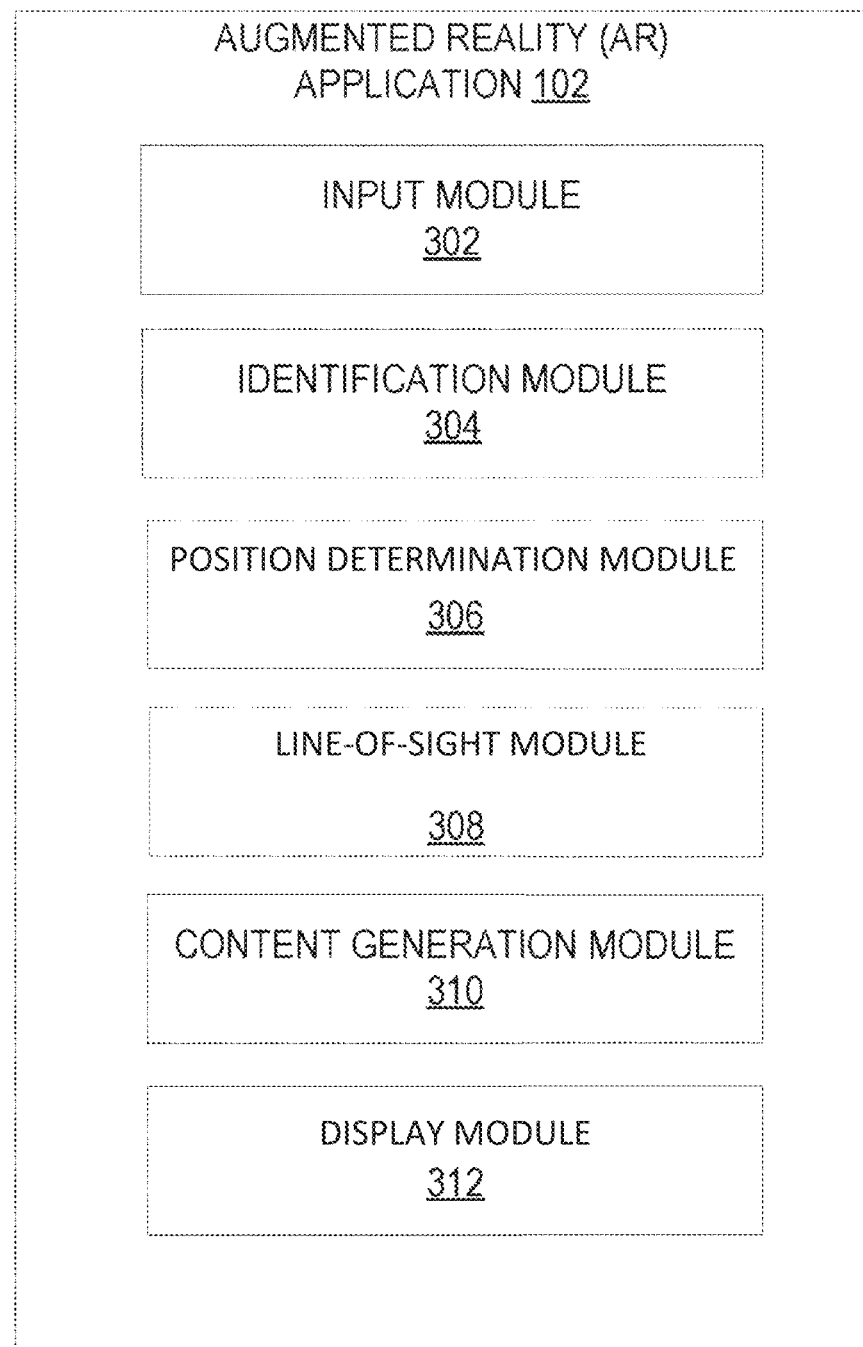
FIG. 3 illustrates a block diagram of an AR application in accordance with some embodiments.

FIG. 3 illustrates a block diagram of an example embodiment of an AR application 210, according to some embodiments. To avoid obscuring the inventive subject matter with unnecessary detail, various functional components (e.g., modules) that are not germane to conveying an understanding of the inventive subject matter have been omitted from FIG. 3. However, a skilled artisan will readily recognize that various additional functional components may be supported by the AR application 210 to facilitate additional functionality that is not specifically described herein. Furthermore, the various functional modules depicted in FIG. 3 may reside on a single computing device or may be distributed across several computing devices in various arrangements such as those used in cloud-based architectures.

As shown, the AR application 210 includes an input module 302, an identification module 304, a position determination module 306, a line-of-sight determination module 308, a content generation module 310 and a display module 312.

The input module 302 receives sensor data from sensors 202, sensor data may include, for example, and without limitation optical image data of the physical object, ToF data, imaged light patterns, location/positional data, other data associated with an operation of the various sensors, and a combination thereof. The input module 302 provides the received sensor data to any of the other modules included in the AR application 210.

The identification module 304 identifies a physical object and corresponding virtual content based on an image of the physical object captured by sensors 202 of the display system. For example, the identification module 304 can determine whether the captured image matches or is similar to an image locally stored by the display system in the storage device 206.

The identification module 304 compares a captured image of the physical object to a local content dataset of images locally stored in the storage device 206 to identify the physical object. For example, the identification module 304 can analyse the captured image of a physical object to identify feature points of the physical object. The identification module 304 can utilize the identified feature points to identify the physical object from the local content dataset.

If the identification module 304 cannot identify a matching image from the local content dataset, the identification module 304 can provide the captured image of the physical object to the server and the server can search a remote content dataset maintained by the server.

Once the physical object 104 has been identified, the identification module 304 can access the corresponding virtual content to be presented on the transparent display 204 to augment the reality of the user.

The position determination module 306, determines the position of the physical object in relation to the display system. The position determination module 306 can analyse images of the physical object to determine the position of the physical object in relation to the display system. For example, the position determination module 306 can analyse images captured by the sensors 202 and identify the physical object in the captured image. The position determination module 306 then determines the position of the physical object in relation to the display system based on the location of the physical object in the captured image.

The line-of-sight module 308 uses the position determined by the position determination module 306 and, for example, eye-tracking information of the user to determine information related to a line-of-sight from the user to the physical object (e.g. cyclist). The line-of-sight module 308 may use any suitable technique to identify a line-of-sight and detect if another object (e.g. a car) is obscuring (e.g. impeding, partially blocking or fully blocking) the user's view of the identified physical object (e.g. cyclist). By way of example only, the line-of-sight module 308 may determine that the line-of-sight to the physical object is blocked if the physical object is no longer detectable by the identification module 304. The line-of-sight module 308 may provide a first output if the line-of-sight is clear and a second output if the line-of-sight is impeded. Reference herein to the eye-tracking or user-tracking is by way of example only of one method of determining if the user's view is blocked and it is not essential that the present invention utilises eye-tracking or user-tracking information to function as disclosed herein. In some embodiments, the step of determining whether the line-of-sight is block is based on a fixed viewing position—e.g. fixed eye-box position such as the centre of the eye-box.

The content generation module 310 generates virtual content based on the output of the line-of-sight module 308. For example, the content generation module 310 changes the display form (e.g. shape) of the virtual content if the output of the line-of-sight module 308 changes.

The display module 312 renders the virtual content on the transparent display 204. This can include virtual content intended to augment physical objects visible through the transparent display 204. In some embodiments, the display module 312 calculates a hologram of the output of the content generation module 310. The display module 312 can render the virtual content based on the position of a physical object corresponding to the virtual content. For example, the display module 312 can render the virtual content at a display position on the transparent display 204 that causes the virtual content to appear as overlapping and/or near the physical object to a user.

The display module 312 continuously updates rendering of virtual content on the transparent display 204. For example, the display module 312 updates the display of the virtual content as the depth and/or position of a physical object 104 changes. Accordingly, the virtual content appears to be a part of the user's real-world environment and paired with its corresponding physical object. In some embodiments, holograms are calculated in real-time.

Figure 4A:
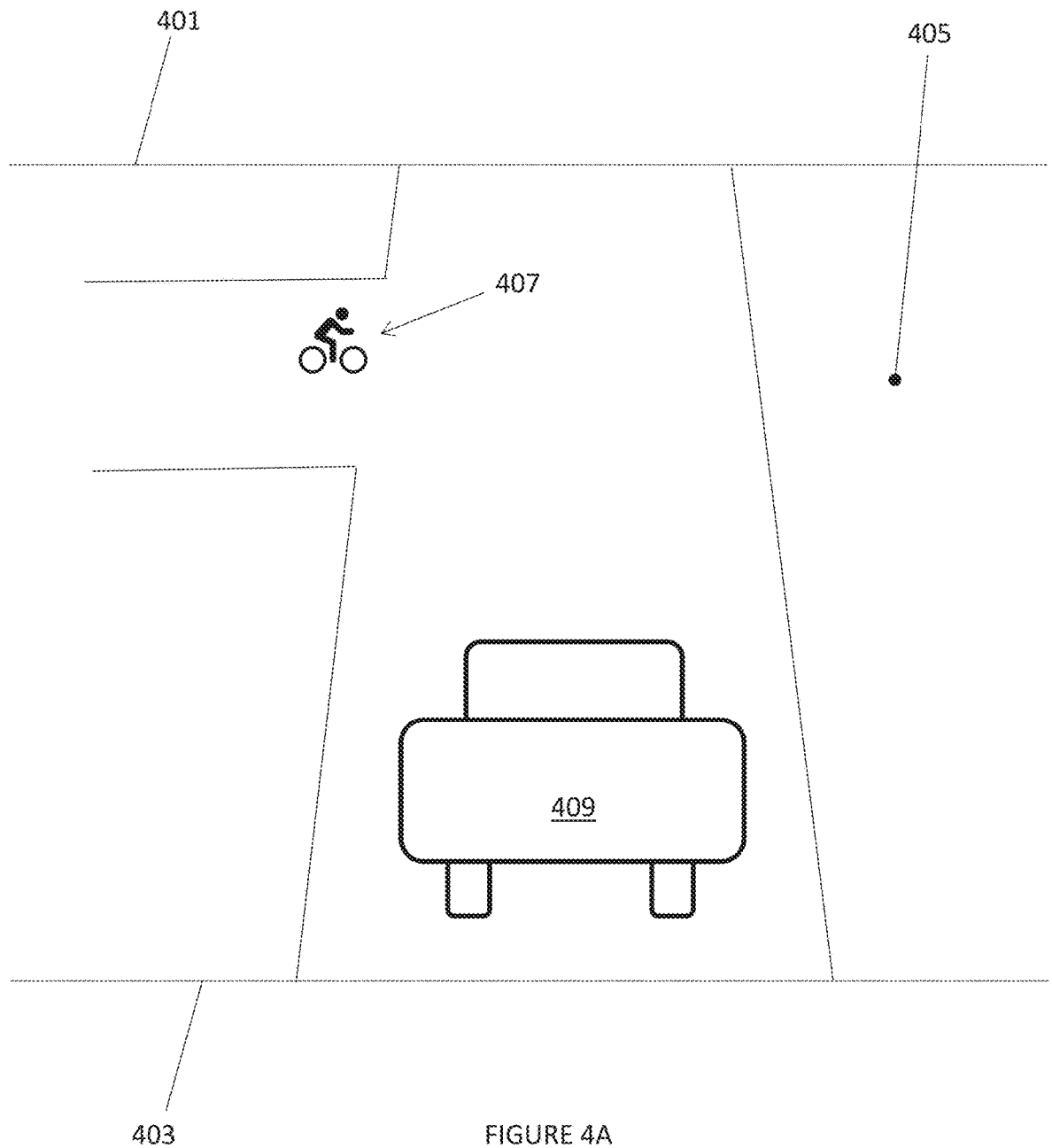
FIGS. 4A, 4B, 4C 4D and 4E illustrate an example AR environment in which the physical form of virtual content associated with a detected physical object is changed in response to detection of an impeded line of sight.
Figure 4B:
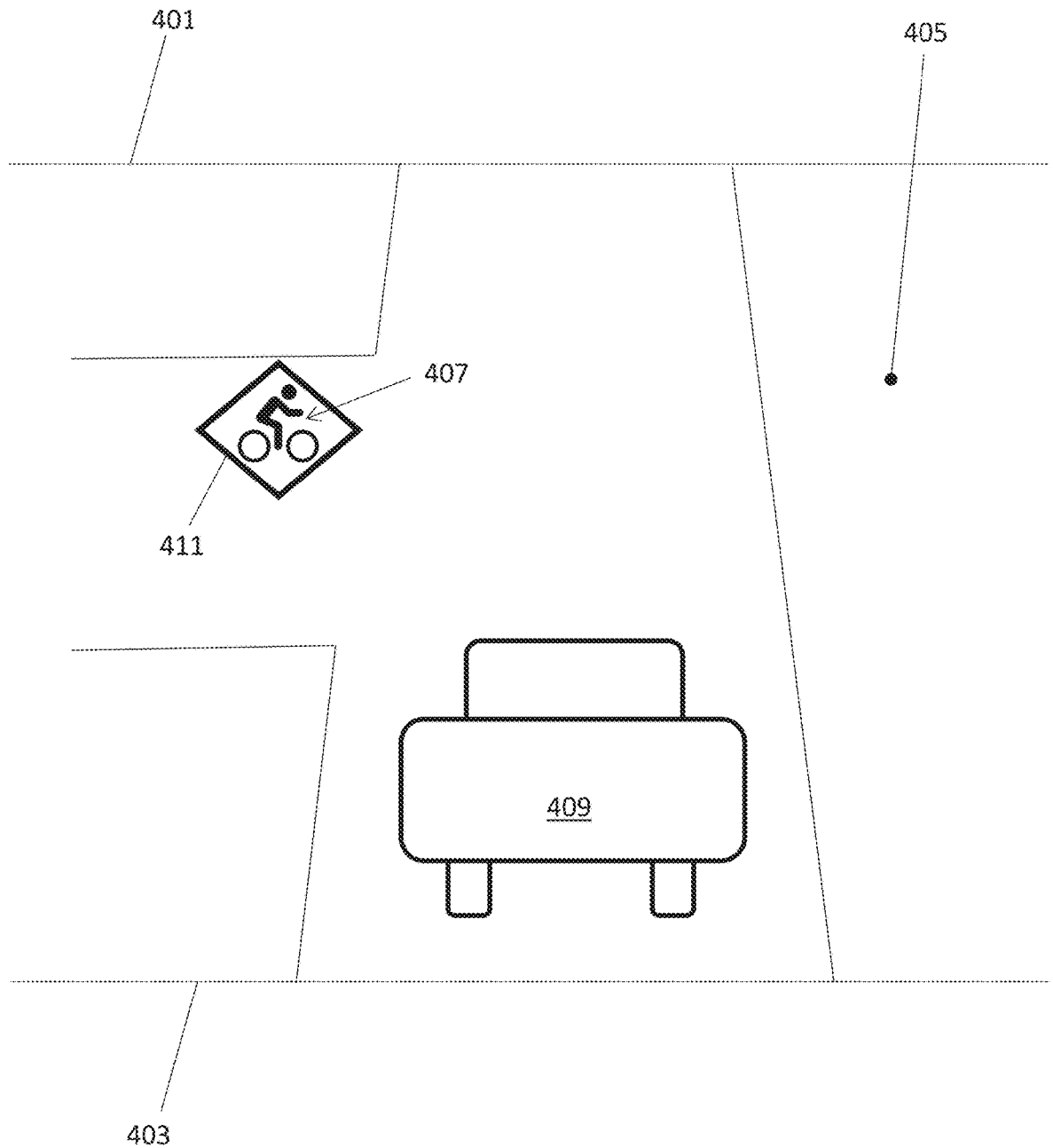
Figure 4C:
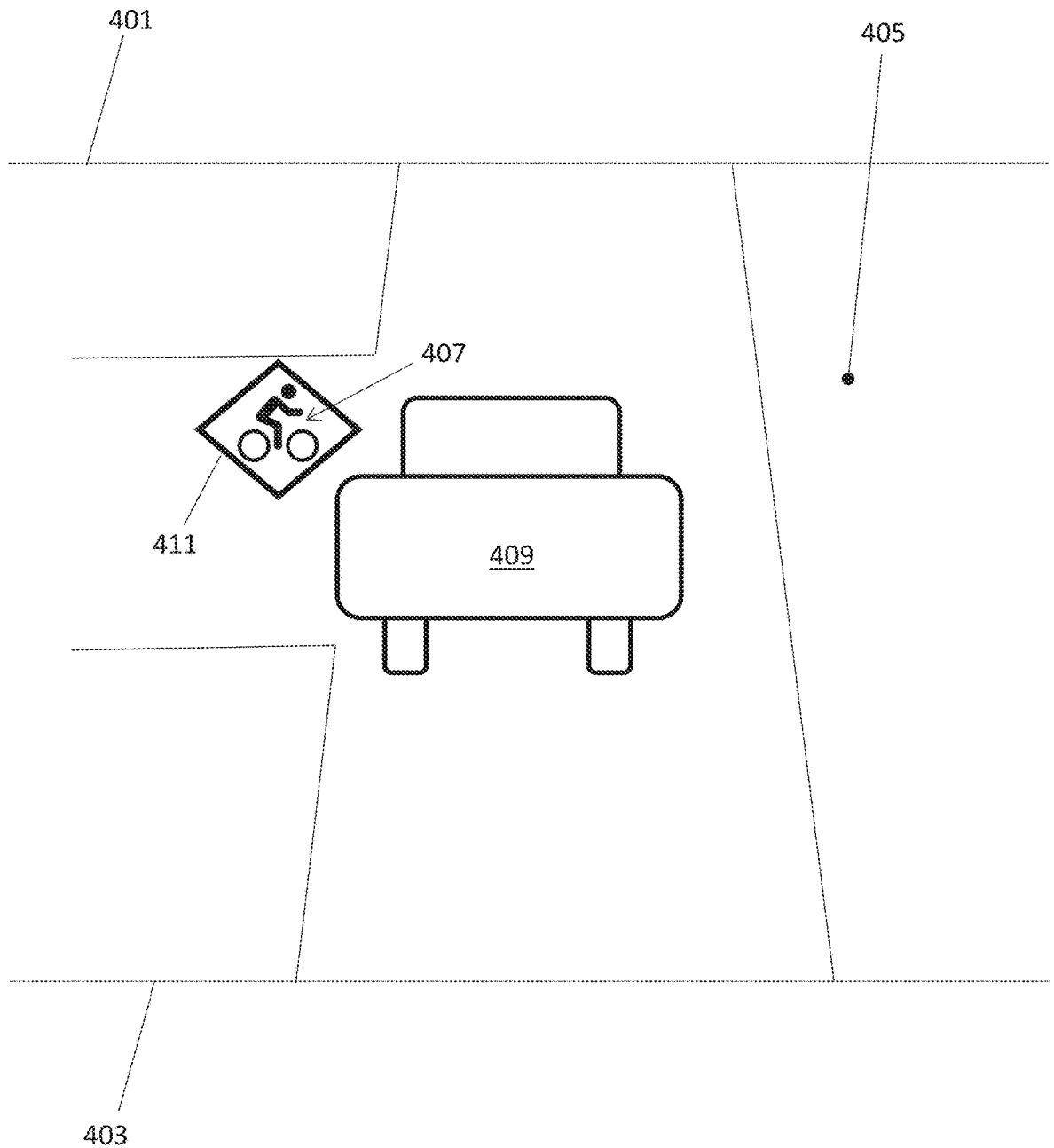
Figure 4D:
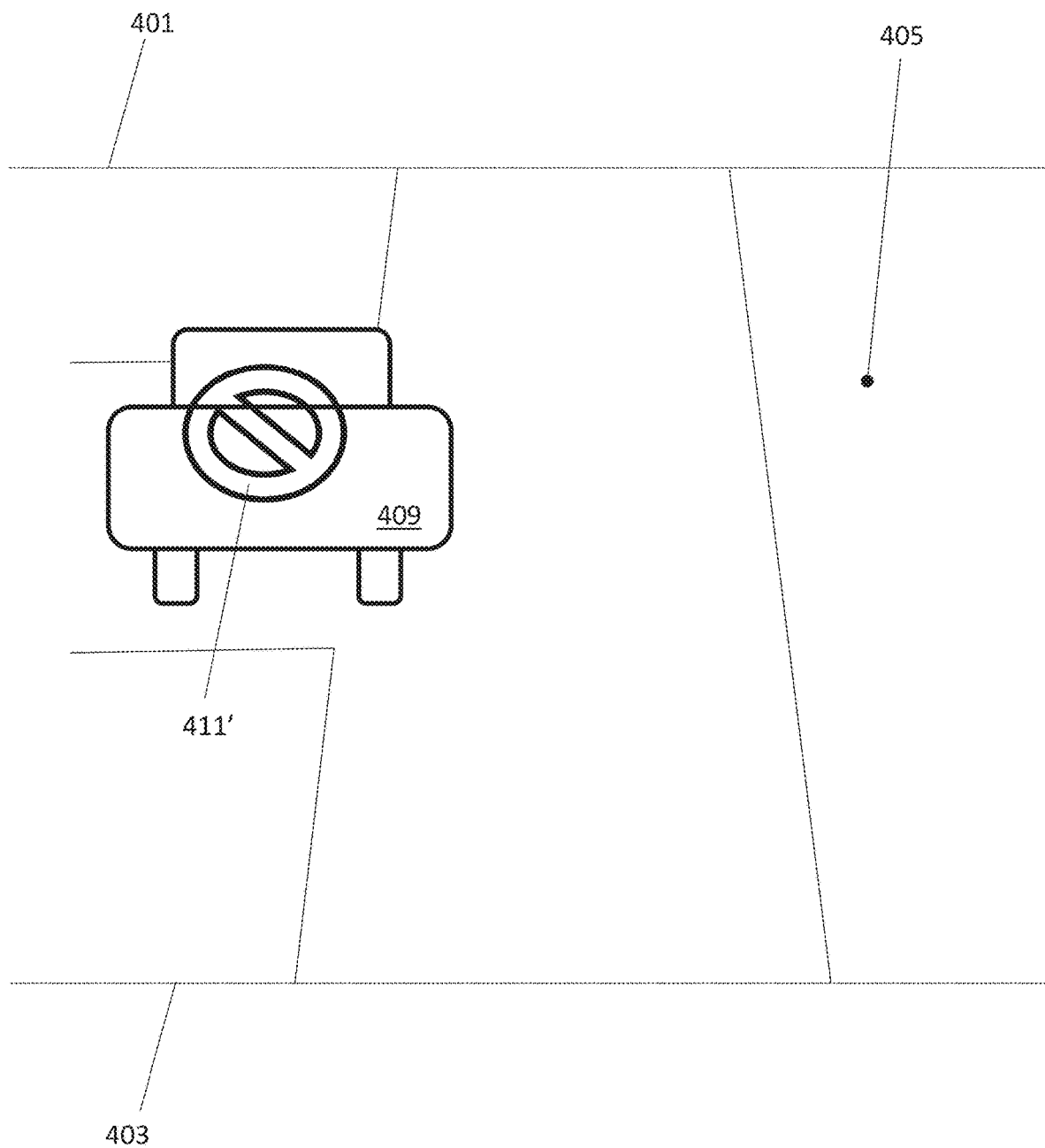
Figure 4E:
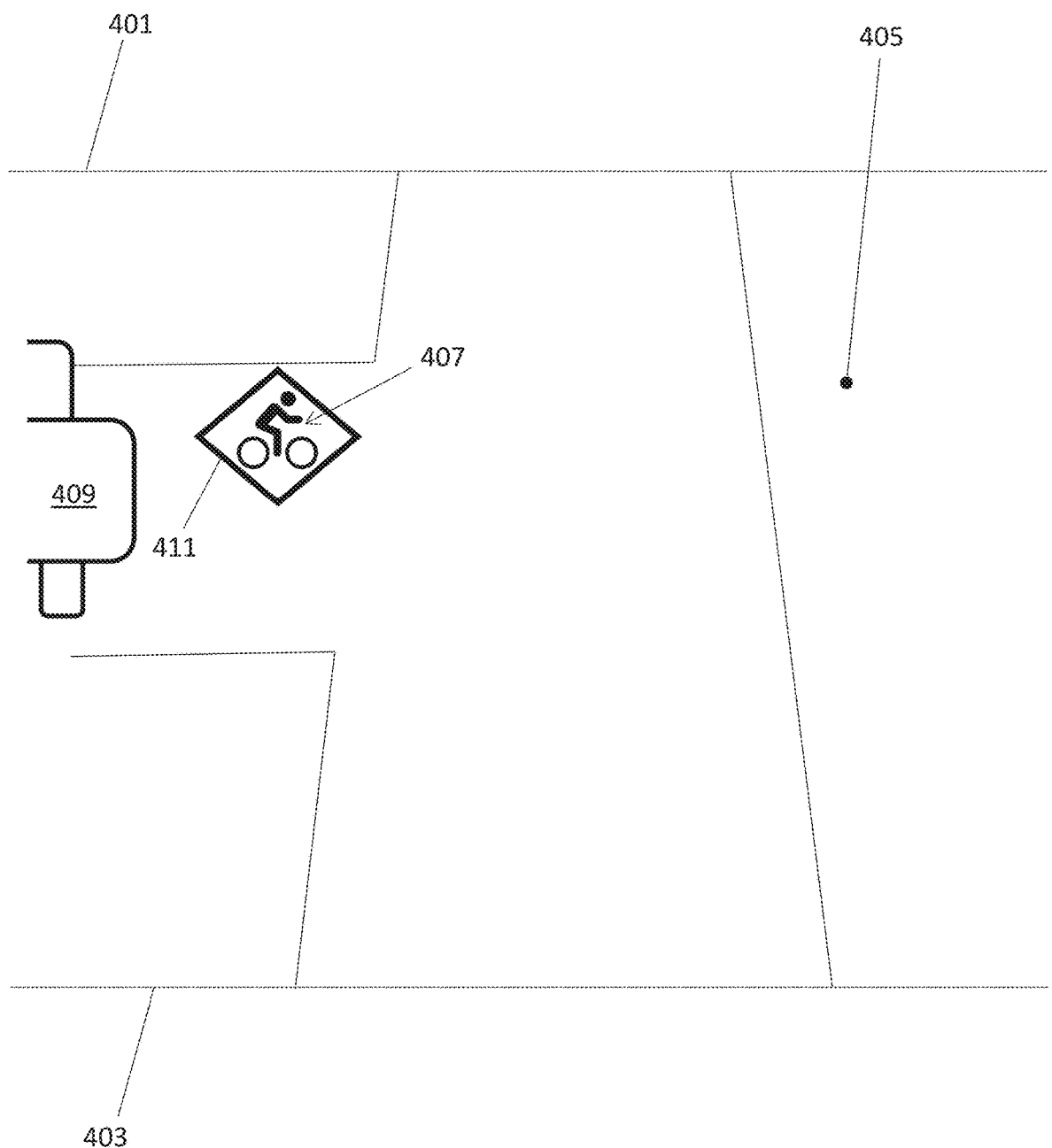

FIGS. 4A to 4E illustrate an embodiment of the present disclosure by way of example only. FIGS. 4A to 4E show the upper boundary 401 and lower boundary 403 of a field of view 405 defined by a vehicle windscreen. FIGS. 4A to 4E also show a cyclist 407 (which corresponds to the physical object of the prior description) and another car 409 which is moving towards the cyclist 407. FIG. 4A shows the events before the display system detects the cyclist. FIG. 4B shows the virtual content 411 (having a diamond shape in this example) projected by the projection system of the present disclosure. It is said that the virtual content 411 corresponds to the cyclist 407. The virtual content 411 draws the user's attention to the cyclist 407 at a road junction in this example. FIG. 4C shows the car 409 turning towards the cyclist 407 but not impeding the user's view of the cyclist 407. The virtual content 411 is therefore still a diamond shape. As the car 409 manoeuvres further, it moves to a position or positions that imped the user's view of the cyclist 407 (FIG. 4D). This is detected by the system of the present disclosure and, in response, the physical form of the virtual content 411' is changed. The changed virtual content 411' may have the form of a blind spot icon which will be familiar to the person skilled in the art of driver assistance systems. As the car manoeuvres away from the cyclist, line-of-sight is restored and, optionally, the virtual content 411 returns to its original form (FIG. 4E). It can therefore be understood that the virtual content has a first form 411 when the corresponding line-of-sight is clear and a second form 411' when the line-of-sight is not clear. These features provide the user with a visual warning that a physical object is hidden, out of sight, behind the car 409. For the avoidance of doubt, in FIG. 4D, the cyclist is not visible because it is behind the car (from the viewer's perspective) but the virtual content 411' is visible because it is overlain on the real-world scene by the projector.

Additional Features

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

The invention claimed is:

1. A head-up display for a vehicle, the head-up display comprising:
    a projector arranged to project image content visible from a viewing position in an eye-box;
    a processor arranged to receive captured images of a scene visible from the viewing position of the eye-box and,
        at a first time:
            detect a first object in a scene from a first image captured at the first time, the first object being visible from the viewing position of the eye-box, and
            drive the image projector to project a first icon that appears, from the viewing position, to be substantially aligned with the first object; and
        at a second time later than the first time:
            determine a line of sight from the viewing position of the eye-box to the first object from a second image captured at the second time,
            detect a second object in the scene,
            determine that the second object is in the line of sight from the viewing position to the first object such that the second object at least partially blocks a view of the first object from the viewing position, and
            drive the image projector to stop projecting the first icon and start projecting a second icon as an overlay on the second object in response to the determination that the second object is in the line of sight from the viewing position to the first object, wherein the second icon differs in visual appearance from the first icon in at least one aspect of a physical form of the second icon.

2. A head-up display as claimed in claim 1 wherein the at least one aspect of the physical form of the second icon is a shape of the second icon.

3. A head-up display as claimed in claim 1 wherein the at least one aspect of the physical form of the second icon is selected from the group consisting of colour, size and luminance.

4. A head-up display as claimed in claim 1 wherein the image projector is a holographic projector comprising a spatial light modulator arranged to display a hologram of the projected image content.

5. A head-up display as claimed in claim 1 wherein the image content is projected using an optical combiner such that the image content complements/adds to/overlays the scene visible from the viewing position of the eye-box.

6. A head-up display as claimed in claim 1 wherein the processor is arranged to continually receive the viewing position of a viewer and determine if the second object is in the line of sight based on the received viewing position.

7. A head-up display as claimed in claim 6 wherein the first object is a moving object, and the processor is arranged to determine whether the second object is in the line of sight to the first object based on the position of the first object at the second time and the received viewing position of the viewer at the second time.

8. A head-up display as claimed in claim 6 wherein the processor is arranged to maintain positional alignment between the second icon and first object based on the received viewing position.

9. A driver assistance system comprising:
    a head-up display as claimed in claim 1;
    a camera arranged to capture images of a scene and continually output the captured images to the head-up display; and
    a user-tracking system arranged to monitor the position of the user of the head-up display and continually output the viewing position of the eye-box to the head-up display.

10. A head-up display as claimed in claim 1 wherein the second icon is not projected in substantial alignment with the second object.

11. A head-up display as claimed in claim 1 wherein the image projector is driven such that no projected icon is associated with the second object.

12. A driver assistance system comprising:
    a head-up display as claimed in claim 1; and
    a user-tracking system arranged to monitor the position of the user of the head-up display and continually output the viewing position of the eye-box to the head-up display.

13. A method of head-up display to a viewing position in an eye-box, the method comprising:
    capturing a first image of a scene at a first time;
    detecting a first object in the first image of the scene, the first object being visible from the viewing position of the eye-box at the first time;
    projecting a first icon that appears, from the viewing position, to be substantially aligned with the first object; then
    capturing a second image of the scene at a second time;
    detecting a second object in the second image of the scene;
    determining that the second object is in the line of sight from the viewing position to the first object at the second time, such that the second object at least partially blocks a view of the first object from the viewing position; and
    stopping projection of the first icon and starting projection of a second icon as an overlay on the second object in response to the determination that the second object is in the line of sight from the viewing position to the first object, wherein the second icon differs in visual appearance from the first icon in at least one aspect of the physical form of the of the second icon.

14. A method of head-up display as claimed in claim 13 wherein the at least one aspect of the physical form of the second icon is a shape of the second icon.

15. A method of head-up display as claimed in claim 14 wherein the at least one aspect of the physical form of the second icon is selected from the group consisting of colour, size and luminance.

16. A method of head-up display as claimed in claim 13, further comprising continually receiving the viewing position of a viewer, and wherein the determination if the second object is in the line of sight is based on the received viewing position.

17. A method of head-up display to a viewing position in an eye-box, the method comprising:
    capturing a first image of a scene at a first time;
    detecting a first object in the first image of the scene, the first object being visible from the viewing position of the eye-box at the first time;
    projecting a first icon that appears, from the viewing position, to be substantially aligned with the first object; then
    capturing a second image of the scene at a second time;

detecting a second object in the second image of the scene;

determining from the second image that the second object at least partially blocks a view of the first object from the viewing position to the first object at the second time; and stopping projection of the first icon and starting projection of a second icon as an overlay on the second object in response to the determination that the second object at least partially blocks the view of the first object from the viewing position, wherein the second icon differs in visual appearance from the first icon in at least one aspect of the physical form of the second icon.

18. A method as claimed in claim 17 wherein the first object is a moving object.

19. A method as claimed in claim 17 wherein the processor is arranged to maintain positional alignment between the second icon and first object based on the viewing position.

20. A method as claimed in claim 17, further comprising continually receiving the viewing position of a viewer, and wherein the determination if the second object is in the line of sight is based on the received viewing position.

* * * * *